J. P. SMITH.
FRONT AXLE SPRING SUSPENSION FOR PERAMBULATORS.
APPLICATION FILED JAN. 8, 1915.

1,200,662. Patented Oct. 10, 1916.

Witnesses:

Inventor:
John P. Smith

UNITED STATES PATENT OFFICE.

JOHN P. SMITH, OF ELKHART, INDIANA, ASSIGNOR TO SIDWAY MERCANTILE COMPANY, OF ELKHART, INDIANA, A CORPORATION OF INDIANA.

FRONT-AXLE SPRING SUSPENSION FOR PERAMBULATORS.

1,200,662.  Specification of Letters Patent.  Patented Oct. 10, 1916.

Application filed January 8, 1915. Serial No. 1,109.

*To all whom it may concern:*

Be it known that I, JOHN P. SMITH, residing in Elkhart, Elkhart county, Indiana, have invented certain new and useful Improvements in Front-Axle Spring Suspensions for Perambulators, of which the following is a specification.

My invention relates to infant perambulators and has particular reference to improvements in the spring suspensions or supports for the bodies of such vehicles.

The object of my invention is to improve the spring supports of perambulator bodies, both as to ease and uniformity of action and as to appearance, and also as to their cost.

A special object of my invention is to provide a spring structure of this class in which both the fore and the aft springs shall rise from the front axle of the vehicle. The front wheels of the perambulator are the first to encounter obstacles. The rear wheels are as a rule better guarded by reason of their proximity to the handle or pusher of the perambulator and yet occasionally receive heavy shocks. By employing springs, which, as hereinafter described, rise from the same point, usually the front axle, I secure an easier and more uniform action for the relief of the body from blows on the front wheels while at the same time the principal weight of the perambulator body is nicely spring poised above the rear wheels, the shocks therefrom being diverted from the rear to the front axle and thence through the springs to the body. This action is particaularly advantageous at moments of extraordinary shock to the rear wheels as when dropping from or when mounting a curb.

A further object of my invention is to accomplish the foregoing purpose by the employment of forms and shapes which shall improve the appearance of the perambulator, with parts so employed serving as stops to limit the spring action of the body.

A still further object of my invention is to provide a spring suspension of this class which shall permit easy vertical movement of the body upon the running gear and yet be substantially rigid as concerns both fore and aft and sidewise movements of the body upon the running gear.

My invention resides in the improvements hereinafter described and particularly pointed out in the appended claim; and will be more readily understood by reference to the accompanying drawings forming a part of this specification and in which—

Figure 1:
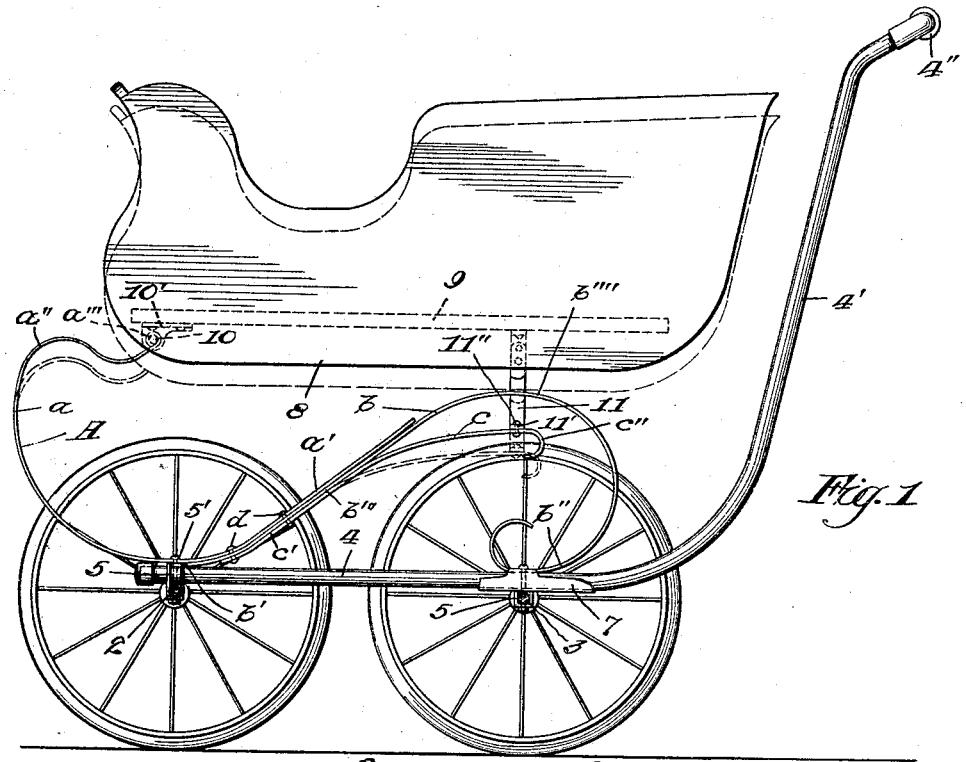
Figure 2:
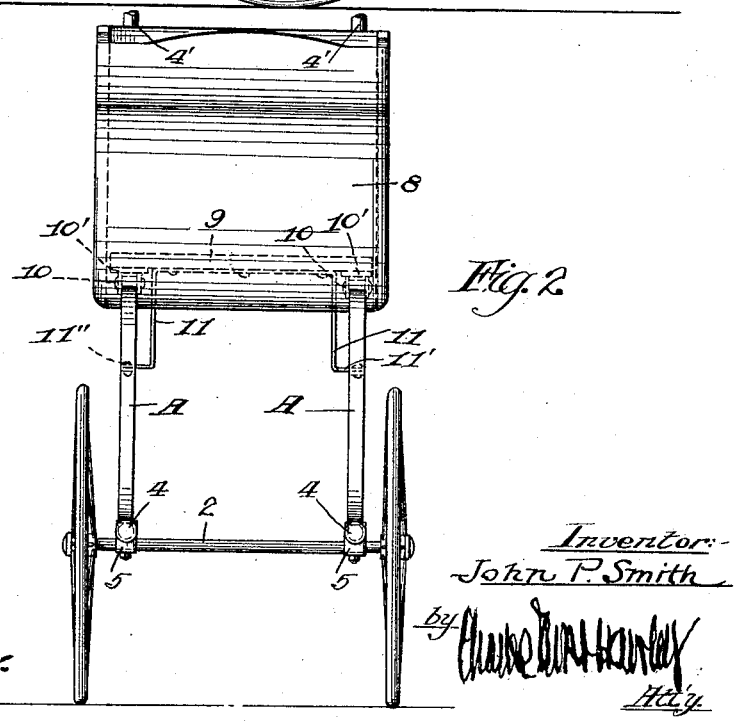

Figure 1 is a side elevation of a perambulator embodying my invention; and, Fig. 2 is a front elevation thereof.

In the main the perambulator is of well known design, differing from others only in the so called spring suspension. Thus, 2, is the front axle and, 3, the rear axle, bearing front and rear wheels respectively. The axles are joined by the reach bars, 4, 4, the fastenings being the U-shaped clips, 5. At the rear end, the reach bars are extended rearwardly and upwardly to form the push bars, 4', which are joined by the cross handle, 4''. To strengthen the connection between the parts 4 and 4' and with the rear axle, I preferably employ the metal reinforcing sockets, 7, shown in Fig. 1. The body, 8, may be of any pleasing outline and comprises a bottom, 9, and the sides and ends attached thereto.

The spring suspension devices by which the body is supported are two upright and symmetrical spring structures, A, A, which are identical. A description of one will serve for both. As best shown in Fig. 1, each thereof comprises three main parts, to wit, the front spring, $a$, the middle part, $b$, and the rear spring, C. The member has its forward end $b'$ rigidly attached to the front axle, 2, *i. e.* to the reach bar, 4, above the axle, and from thence sweeps upwardly and rearwardly nearly to the body, 8, and thence is curved rearwardly and downwardly and terminates in an ornamental forward bend, $b''$, which is rigidly secured to the rear axle, 3, or to the top of the reach bar, 4, above the axle. This member, $b$, is virtually a rigid member and except as hereinafter described is not depended upon for spring action. It is the anchorage for the fore and aft springs, $a$, and $c$, and provides stops which limit the play of the aft or rear spring. At the same time its general o-gee and partial S curves afford a pleasing appearance which dominates the design of the perambulator. The spring front, $a$, has a straight portion, $a'$, which is secured to the relatively straight intermediate part, $b'''$, of member, $b$, by means of rivets, $d$, from whence it sweeps downwardly to the fastening, 5', on the front axle, resting also upon the forward end of the member $b$. From that point the spring,

*a*, sweeps forwardly and upwardly to the top bend, *a''*, which it is preferably turned downwardly and thence upwardly, terminating in a loop or eye, *a'''*. This eye receives the anchor pintle, 10. Said pintle is arranged in a block or fitting, 10' (see dotted line) fastened on the bottom board, 9, at the front end of the body, 8. The member, *a*, in the form here presented, or any near proximation, is a true C-spring and provides an easy and adequate spring support for the front end of the body. The rear member, *c*, is a true leaf spring. Its relatively straight end, *c'*, is secured to the straight part, *b'''*, of member, *b*, by means of rivets, *d*. Either non-adjustable or adjustable fastenings may be used at this point, the latter being desirable when the spring, *c*, is to be adjusted to the weights of several infants. From the fastening point, *d*, the spring, *c*, extends upwardly and rearwardly and terminates in an ornamental bend, *c''*, beneath the arch, *b''''*, of the member, *b*. At this arch point I provide a depending bracket 11, on the bottom, 9. The bracket is rigidly secured to the bottom, 9, and has a right-angled foot or bend, 11', secured to the top of the spring, *c*, by a rivet, 11''. It will be noted that the arch of the member *b*, is normally positioned about mid-way between the spring, *c*, and the bottom of the body, 8. The arch therefore conveniently serves as a limiting stop upon the motion of the parts in both directions; and incidentally it possesses sufficient spring or flexibility to act as a soft or yielding stop for said parts. By thus supporting the rear end of the body from the forward part of the member, *b*, and hence from the front axle, I relieve the body from the direct effect of shocks on the rear wheels; for, as will be clear, such shocks can reach the body only through the distant path afforded by the reach bars, 4, the member, *b*, and the long leaf spring. By fastening the body directly and rigidly to the springs, *c*, it is effectively secured against fore and aft movement upon the running gear. While the upright portions of the brackets, 11, do not normally engage the arches of the members, *b*, they nevertheless coöperate therewith to prevent excessive sidewise swaying of the body.

Having thus described my invention, I claim as new and desire to secure by Letters Patent:—

The herein described improvement, comprising a perambulator running gear and a body, in combination with front and rear brackets on the bottom of said body, C-springs rising from the front end of the running gear and anchored upon said front brackets, leaf springs extending upwardly and rearwardly from the forward part of the running gear and attached to said rear brackets, and arch members fixed to the front and rear parts of the running gear and having arch portions interposed between said leaf springs and the body and serving as motion limiting stops.

In testimony whereof, I have hereunto set my hand, this 1st day of December, 1914, in the presence of two subscribing witnesses.

JOHN P. SMITH.

Witnesses:
F. D. FIELDS,
F. M. ERTS.